Oct. 11, 1932.  A. W. PHELPS  1,881,966
GRINDING APPARATUS
Filed July 26, 1929  4 Sheets-Sheet 1

Oct. 11, 1932.     A. W. PHELPS     1,881,966
GRINDING APPARATUS
Filed July 26, 1929     4 Sheets-Sheet 2

Inventor
Alva W. Phelps

By Spencer Hardman & Fehr
his Attorneys

Oct. 11, 1932. A. W. PHELPS 1,881,966
GRINDING APPARATUS
Filed July 26, 1929 4 Sheets-Sheet 4

Inventor
Alva W. Phelps
By Spencer Hardman & Fehr
his Attorneys

Patented Oct. 11, 1932

1,881,966

UNITED STATES PATENT OFFICE

ALVA W. PHELPS, OF ANDERSON, INDIANA, ASSIGNOR TO DELCO-REMY CORPORATION, OF ANDERSON, INDIANA, A CORPORATION OF DELAWARE

GRINDING APPARATUS

Application filed July 26, 1929. Serial No. 381,312.

This invention relates to grinding machinery, and more particularly, to machines for grinding off the excess welding material which accumulates at the welded seam of a length of tubing made of sheet material bent into cylindrical form. One type of such grinding machine is disclosed in the patent of Rodger J. Emmert, No. 1,749,329, granted March 4, 1930.

The machine shown in the Emmert application has a chain conveyor provided with lugs which engage short lengths of form tubing and push them along guides to a grinding wheel so shaped and located as to abrade the excess welding material and leave the surface adjacent the seam substantially cylindrical and in conformity with the remainder of the exterior surface of the tubing.

One of the objects of the present invention is to provide for grinding away the excess weld material with substantial uniformity of results regardless of variation within certain limits in the external diameter of the tube. In order to accomplish this result the present machine provides stop plates located in proximity to the periphery of the grinding wheel where the pieces of tubing are conveyed against it, and members for resiliently urging the pieces of tubing against the stop plates while they are being conveyed along and against the driving wheel. By forcing the piece of tubing against stop plates which are located on opposite sides of the wheel near its periphery and at a definite distance from its axis, the seam welding material will be ground off substantially flush with the cylindrical surface adjacent the seam regardless of variations in the external diameter of the tube.

Further objects and advantages of the present invention will be apparent from the following description, reference being had to the accompanying drawings, wherein a preferred embodiment of one form of the present invention is clearly shown.

Figure 3:
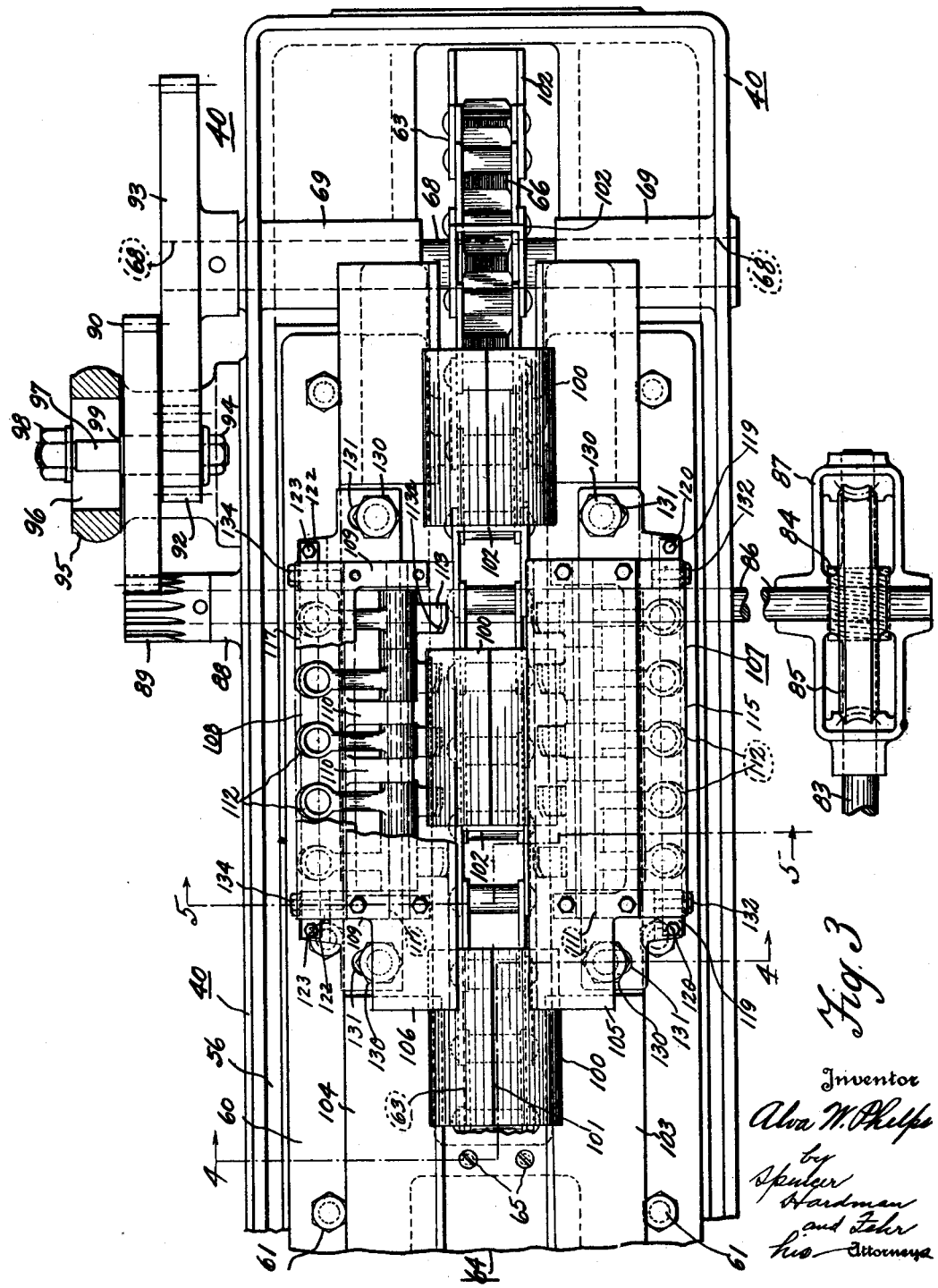
Fig. 3 is a plan view of the work supporting table, certain parts being broken away and others being shown in section for sake of clearness.
Figure 4:
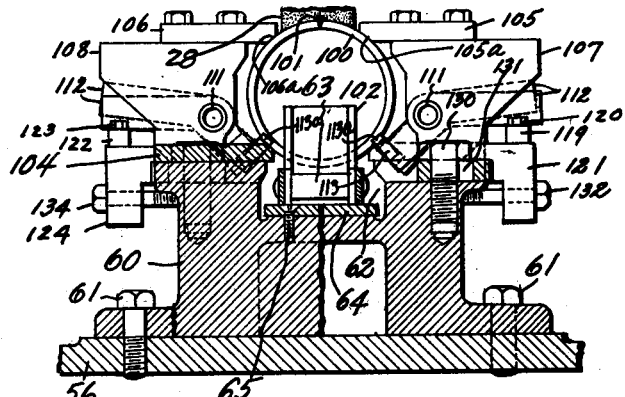
Figure 5:
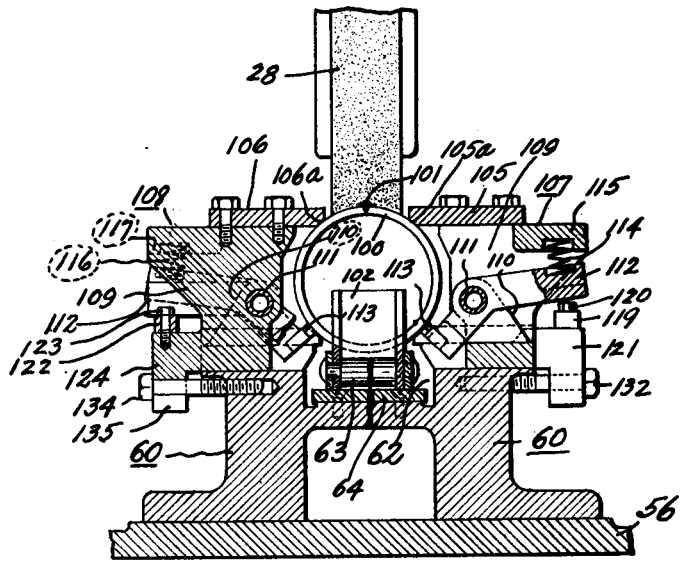

Figs. 4 and 5 are sectional views taken respectively on the lines 4—4 and 5—5 of Fig. 3.

Figure 1:
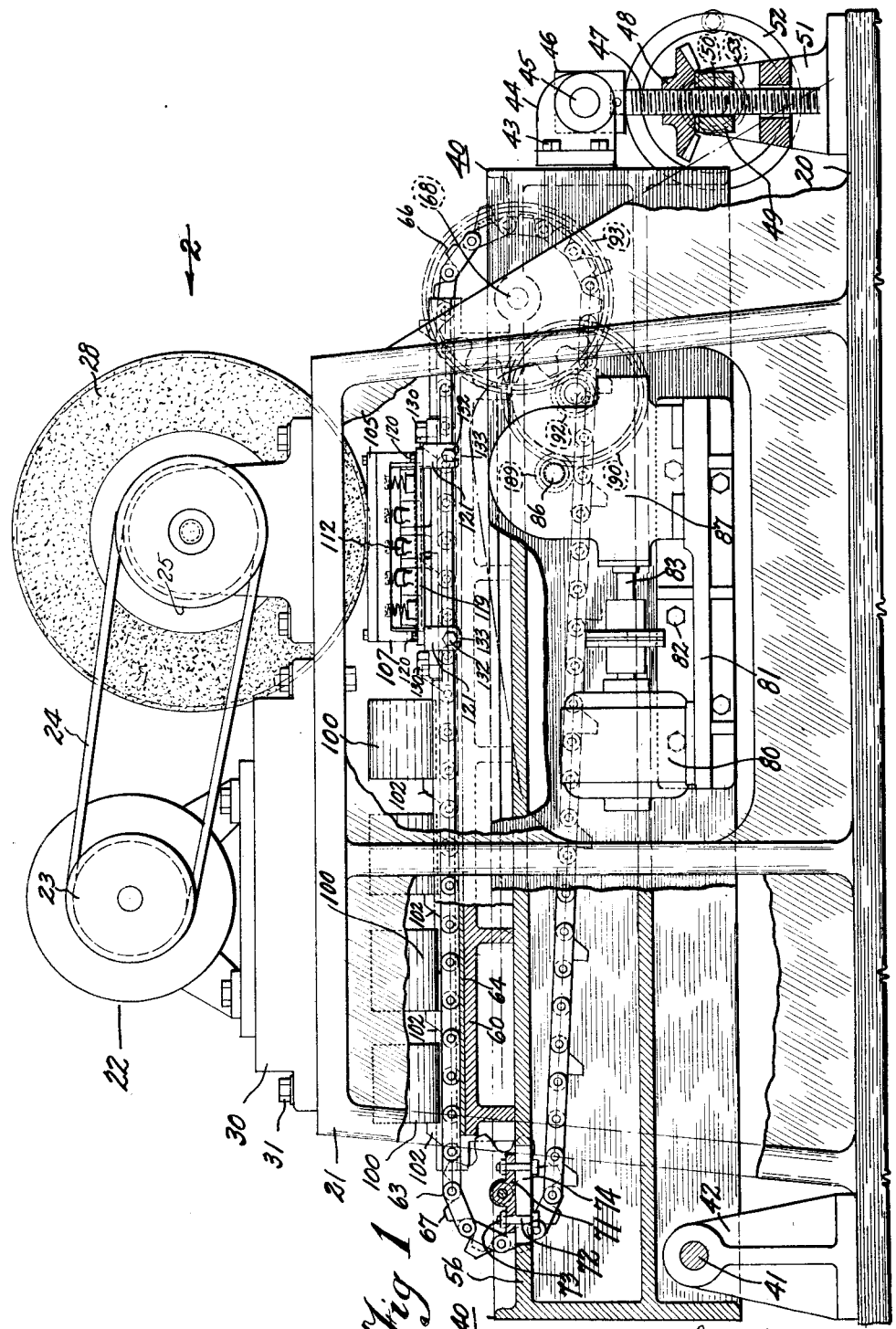
Fig. 1 is a side elevation, partly broken away to show certain parts in section, of a machine embodying the present invention.
Figure 2:
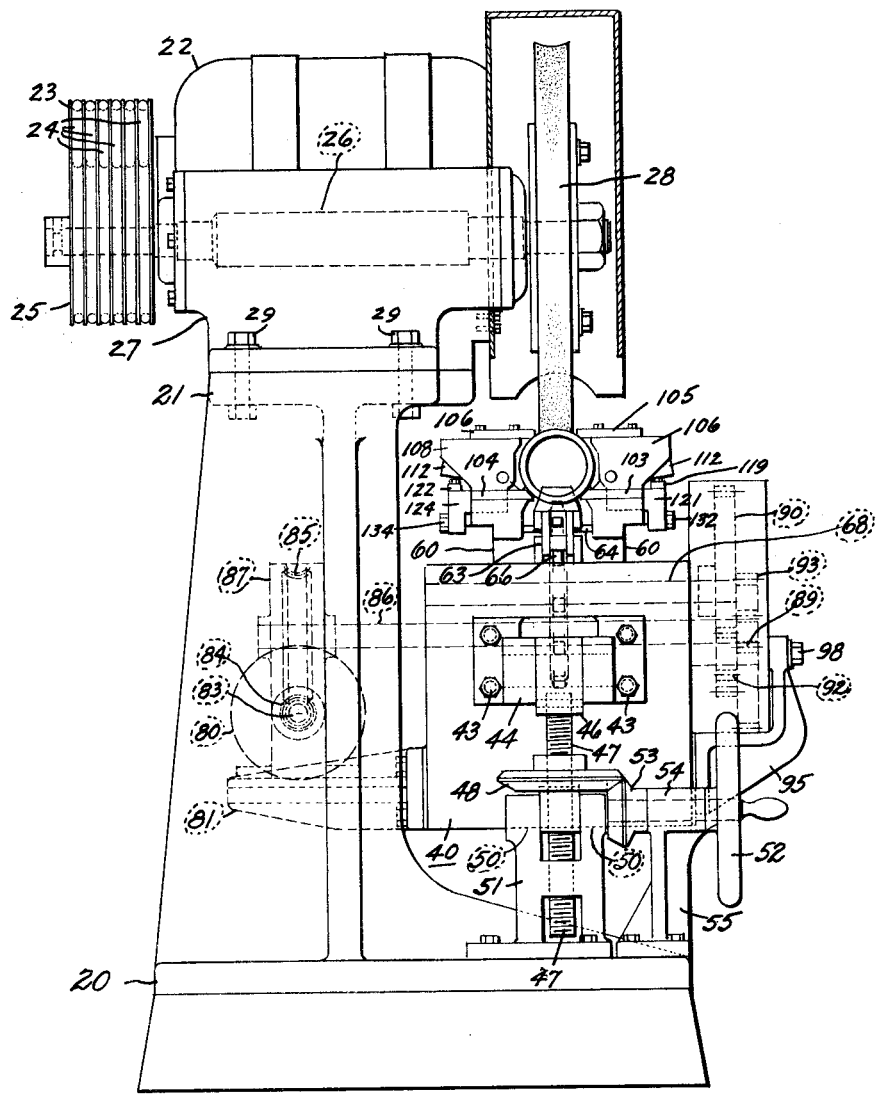
Fig. 2 is a sectional view looking in the direction of arrow 2 in Fig. 1, the grinding wheel housing being shown in section.

Referring first to Figs. 1 and 2, the main frame of the machine comprises a base 20 from which there extends upwardly a pedestal 21 which supports an electric motor 22 driving a multi-groove pulley 23 which, through a plurality of belts 24, drives a multi-groove pulley 25 attached to a spindle 26 mounted in a bearing bracket 27 and driving a grinding wheel 28. Bracket 27 is attached by screws 29 to the pedestal 21. For purpose of tightening the belts 24 the motor 22 is adjustably mounted upon a base 30 secured by screws 31 to the pedestal 21. This adjusting means is not shown as it will be readily understood by those skilled in the art that any well known form of adjusting means may be employed for this purpose.

The machine comprises a work table 40 pivoted at its left hand end as shown in Fig. 1 upon a rod 41 supported by bracket 42 carried by the base 20. Screws 43 secure to the right hand end of the work table a bracket 44 which rests upon a rod 45 extending through a block 46 attached to the upper end of a screw 47 threadedly engaging a bevel gear 48 which in turn rests upon a block 49 having trunnion pins 50 supported by a bifurcated bracket 51 also resting upon the base 20. The screw 47 may be adjusted vertically in order to adjust the work table relative to the grinding wheel by turning the handle which is connected with a beveled gear 53 through a shaft 54 supported by a bracket 55 resting upon the base 20. The gear 53 meshes with the gear 48.

The work table provides a platform 56 to which a conveyor supporting platform 60 is secured by screws 61 shown in Figs. 3 and 4. The conveyor support 60 is shaped to provide a groove 62 which receives a conveyor chain 63 resting directly upon a wear plate 64 attached by screws 65 to the support 60.

The chain 63 passes around a driving sprocket 66 and an idle sprocket 67 located respectively at the right end and at the left hand end of the table 40 as viewed in Fig. 1. The sprocket 66 is connected with a shaft 68 journalled in bearing 69 provided by the table 40. The sprocket 67 is mounted upon a shaft 70 supported by brackets one of which is shown at 71 in Fig. 1. These brackets are adjustably secured to the platform 56 by bolts 72, nuts 73. The bolts 72 pass through slot 74 in the platform 56 to permit of such adjustments of the bracket 71 as are necessary to take up slack in the conveyor chain 63.

In order to move the chain which rests upon the support 60 from left to right as viewed in Fig. 1, the shaft 66 is rotated in a clockwise direction as viewed in Fig. 1 by a power operated mechanism including an electric motor 80 which rests upon a shelf 81 attached by screws 82 to the work table 40. The motor 80 drives the shaft 83 carrying a worm 84 meshing with a worm gear 85 supported by a shaft 86. The worm gears are inclosed by a gear housing 87 also supported by shelf 81. The shaft 86 extends transversely through the table 40 and a bearing 88 provided thereby and is attached to a gear 89 which meshes with a gear 90 rotatable upon a stub shaft 91 and connected with a smaller gear 92 which meshes with a gear 93 attached to the shaft 68. The gears 89 and 93 may be connected by intermediate gear trains having different gear ratios in order to vary the speed of the conveyor chain. In other words, the set of gears 90 and 92 shown in Fig. 3 may be removed from the stub shaft 91 after having removed a nut 94 threadedly connected with the shaft 91, and other sets of gears may be substituted. In order to adjust the axis of the stub shaft 91 to accommodate any set of gears which may be placed thereon so that these gears will mesh respectively with gears 89 and 93, the stub shaft 91 is adjustably secured to a bracket 95 attached to the table 40. The bracket 95 is provided with a horizontal slot 96 through which extends a portion 97 of the shaft 91 of less diameter than that portion which supports the gears 90 and 92. The shaft 91 is adjustably secured to the bracket 95 by tightening a nut 98 threadedly engaging the shaft 91 in order to clamp the bracket 95 between the nut 98 and a shoulder 99 provided by the shaft 91.

The work pieces 100 in the form of welded tubes, the weld material being indicated by numeral 101 in Fig. 5, are moved from the left hand end of the table 40 toward the grinding wheel 28 by means of lugs 102 provided by certain links of the conveyor chain 63. The pieces 100 are moved along rails 103, 104 attached to the conveyor support 60. As the pieces 100 pass under the wheel 28 as shown in Figs. 4 and 5 they are pressed upwardly against stop plates 105 and 106 attached respectively to brackets 107 and 108 supported by the conveyor support 60. Each of the brackets 107 and 108 is provided with end walls 109 and intermediate brackets 110 which support a hollow shaft 111. Each shaft 111 supports a plurality of levers 112 each carrying a wear piece of hard metal 113 so shaped and located as to engage the under side of a work piece 100 and lift it up.

Each of the levers 112 supported by the brackets 107 is urged in a clockwise direction by springs 114 located between each lever 112 and a cross bar 115 which connects the end walls 109 of the bracket 107. Each of the levers 112 supported by the bracket 108 is urged in a counter-clockwise direction by a spring 116 located between each lever 112 and a cross bar 117 connecting the end walls 109 of the bracket 108. The combined effect of these levers 112 which engage the under side of a work piece 100 is to press the work piece 100 upwardly against the stop plates 105 and 106. It will be noted that these plates have beveled surfaces 105a and 106a respectively for engaging the upper surface of the work piece 100 and that these surfaces are located in close proximity to the periphery of the wheel 28 where it engages the work. Therefore, it is apparent that when the table 40 has once been adjusted relative to the wheel 28 in order to grind away the excess weld material from work pieces manufactured according to a certain dimension, slight variations in the external diameter of the pieces will not appreciably change the extent to which the grinding wheel abrades the surfaces of the work adjacent the seam.

When the wear pieces 113 of the levers 112 do not engage any work pieces the levers 112 supported by the bracket 107 are pressed by the springs 114 against a cross bar 119 attached by screws 120 to lugs 121 extending from the bracket 107. Similarly, springs 116 press the levers 112 carried by the bracket 108 against a cross bar 122 attached by screws 123 to lugs 124 extending from the bracket 108, when the wear pieces 113 of these levers are not engaged by the work.

Since the annular end surfaces of the work pieces are located at right angles to the direction of movement and the axes of the levers 112, each wear piece 113 is provided with a beveled surface 113a which, on being engaged by the end surface of the work piece, is cammed downwardly to permit the main non-beveled portion of the wear piece 113 to engage the exterior surface of the work piece.

The beveled edges 105a and 106a of the stop plates 105 and 106 respectively are adjusted into parallel relation with each other and into the proper relation with the grinding wheel by adjusting the brackets 107 and 108 with respect to the conveyor support 60. These brackets are secured to the support 60 by screws 130 each passing through an elongated slot 131 provided in a bracket and threadedly engaging the support 60 as shown in Fig. 4. Before tightening the screws 130 which secure the bracket 107 to the support 60, each end of this bracket may be adjusted relative to the support 60 by turning a screw 132 passing through a notch 133 provided in one of the lugs 121 and having threaded engagement with the support 60. Obviously, the distance from the head of the bolt 132 to the support 60 will determine the adjustment of the lug 121 it being understood that before the screws 130 are tightened the bracket 107 will be pulled until the lugs 121 engage the heads of the screws 132. Similar adjustments of the bracket 108 are made by turning screws 134 passing through notches 135 in the lugs 124 and having threaded engagement with the support 60 as shown in Fig. 5.

By a suitable dressing tool, not shown, the grinding wheel 28 may be trimmed so as to grind a surface of the desired contour. As the diameter of the wheel 28 decreases the table 40 may be elevated by turning the handle wheel 52, in order that the desired amount of material will be abraded from the work.

While the form of embodiment of the present invention as herein disclosed, constitutes a preferred form, it is to be understood that other forms might be adopted, all coming within the scope of the claims which follow.

What is claimed is as follows:

1. Apparatus for grinding tubular work pieces comprising, in combination, a rotary grinding wheel, means for conveying work pieces into position to be engaged by the wheel, stop plates one on each side of the wheel said plates having work engaging surfaces located adjacent the wheel where it engages the work pieces, said surfaces extending transversely to the grinding wheel axis, and means for resiliently urging the work pieces against the work engaging surfaces of said stop plates while being conveyed, said work pieces being held in such position during the grinding operation that the axis of the work piece is transverse to that of the grinding wheel.

2. Apparatus according to claim 1 further characterized by having a plurality of levers each urged by a spring against the work pieces to press them against the stop plates.

3. Grinding apparatus comprising, in combination, a rotary grinding wheel, a chain conveyor for conveying work pieces against the wheel, a chain support along which the conveyor chain travels while moving the work pieces against the wheel, brackets carried by said support, one on each side of the chain, stop plates each carried by one of said brackets and having a work engaging surface located adjacent to the grinding wheel where it engages the work, and means carried by the support for urging the work pieces against the work engaging surfaces of the stop plates.

4. Apparatus according to claim 3 further characterized by having levers pivotally supported by said brackets and each urged by a spring in a direction for causing a lever to press the work against the stop plates.

5. Apparatus for grinding cylindrical work pieces comprising, in combination, a rotary grinding wheel, means for conveying work pieces into position to be engaged by said wheel, stop members on each side of said wheel and having surfaces engaging the work pieces throughout their length during the grinding operation, in order to maintain a constant relaton between the surface of the work pieces and the grinding wheel during said grinding operation, whereby a uniform result is secured regardless of variations in diameter of the work pieces, and a plurality of individually operable means resiliently urging the work pieces against the work engaging surfaces of said stop members during the grinding operation.

6. Apparatus for grinding cylindrical work pieces comprising, in combination, a rotary grinding wheel, means for conveying work pieces into position to be engaged by said wheel, stop members on each side of said wheel and having surfaces engaging the work pieces throughout their length during the grinding operation, in order to maintain a constant relation between the surface of the work pieces and the grinding wheel during said grinding operation, whereby a uniform result is secured regardless of variations in diameter of the work pieces, and a plurality of independently operable spring pressed levers for pressing the work pieces against the stop members during the grinding operation.

In testimony whereof I hereto affix my signature.

ALVA W. PHELPS.